UNITED STATES PATENT OFFICE.

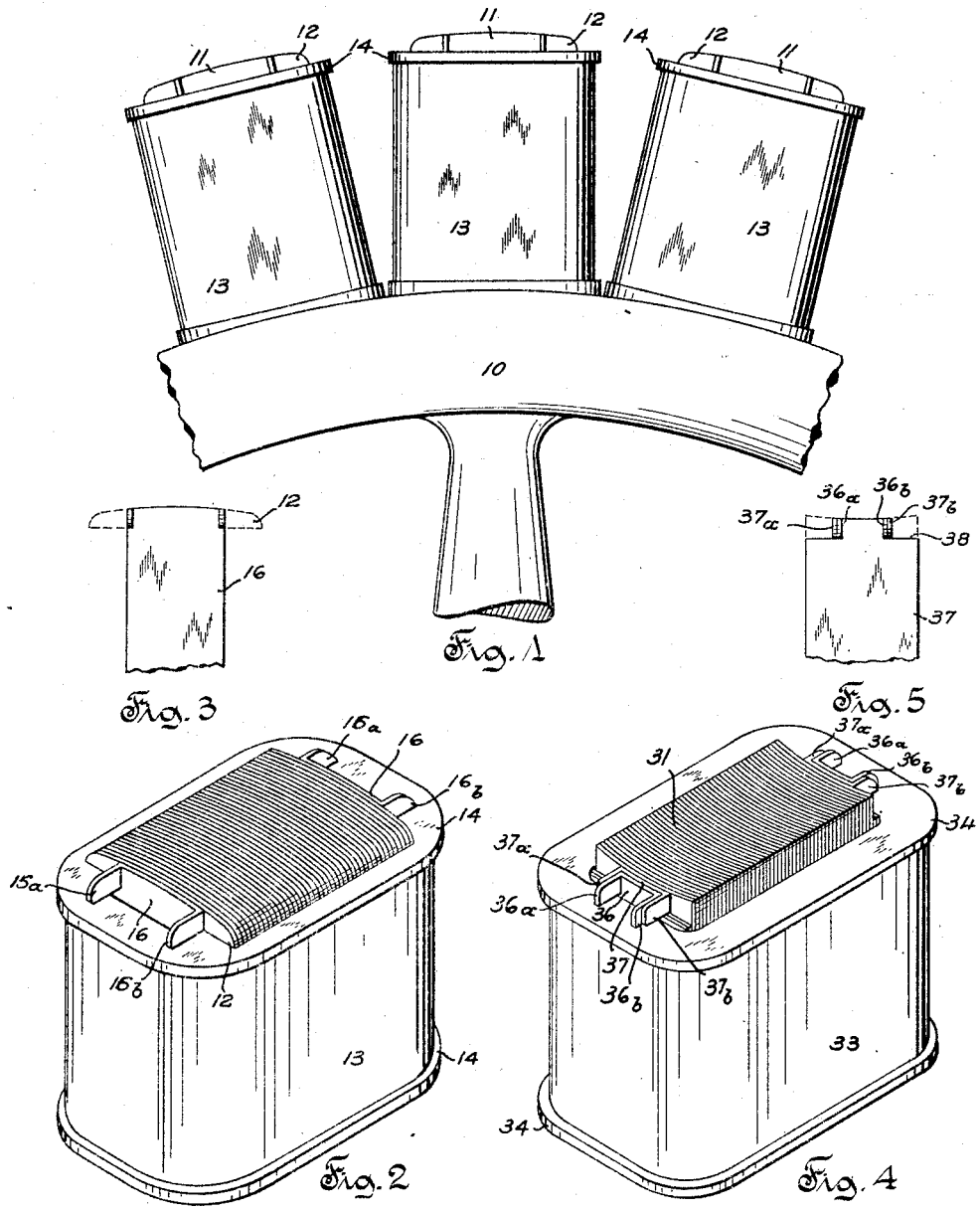

ARTHUR J. BROWN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

FIELD-POLE CONSTRUCTION.

1,279,643.  Specification of Letters Patent.  Patented Sept. 24, 1918.

Application filed August 7, 1915. Serial No. 44,668.

*To all whom it may concern:*

Be it known that I, ARTHUR J. BROWN, a citizen of the United States, residing at Milwaukee, in the county of Milwaukee and State of Wisconsin, have invented a certain new and useful Improvement in Field-Pole Constructions, of which the following is a specification.

This invention relates in general to dynamo-electric machines and has particular reference to such machines as are provided with projecting field poles.

In the ordinary construction of dynamo-electric machines of the projecting field pole type, especially where the field poles are mounted on the rotatable element of the machine, where the strains thereon, due to centrifugal force, may be comparatively great, it is customary to provide an elaborate system of brackets and devices for holding the poles and windings thereon against displacement.

In accordance with this invention, the winding is held in operative position on the field pole without the use of any devices other than the necessary elements of the pole construction.

It is an object of this invention to provide an improved construction of field pole and means associated therewith for securing a winding in place on the pole, the winding-securing means involving the utilization of flux-carrying parts of the pole.

It is a further object of this invention to provide an improved construction of dynamo-electric machine comprising a field pole of the laminated type wherein flux-carrying laminations are utilized for securing a winding in position on the pole.

These and other objects are attained by this invention, the various novel features of which will appear from the description and drawings, disclosing one embodiment of such invention, and will be particularly pointed out in the claims.

In the accompanying drawings:

Figure 1 is a view in elevation of a portion of the rotating element of a dynamo-electric machine provided with projecting field poles embodying features of this invention.

Fig. 2 is a view in perspective of a field pole, with a winding in place thereon, of the construction shown in Fig. 1.

Fig. 3 is a view in elevation of a portion of an end lamination of the type of field pole shown in Figs. 1 and 2.

Fig. 4 is a view similar to Fig. 2, showing a field pole of a type used on the stationary element of a dynamo-electric machine.

Fig. 5 is a view similar to Fig. 3, showing a portion of an end lamination of the type of field pole shown in Fig. 4.

As shown in Figs. 1, 2 and 3, a rotatable element 10 of a dynamo-electric machine is provided with a plurality of spaced field poles 11 provided with pole tips 12. Windings 13 disposed on spools 14 are shown mounted in operative position on the poles 11; although, under certain conditions, it may be desirable and satisfactory to dispense with the supporting spool, the winding then being formed and pressed or baked until it assumes a fairly rigid condition. As shown in Fig. 3, the pole 11 is of the ordinary laminated construction, being made up of a plurality of similar laminations secured together, the end laminations of the pole being indicated at 16.

In assembling the pole and winding, the spool 14, with the winding 13 disposed thereon, may be placed in position before the pole is secured to the rotating element 10, side portions of the spool being supported by the projecting tips 12 of the pole. In order to firmly support that portion of the winding spool at the ends of the pole, considered in relation to the axis of rotation of the machine, the end laminations 16 have their tip portions 16ª and 16ᵇ bent at an angle away from the body portion of these laminations so as to extend over the radially outer side of the spool 14, the lines along which these tip portions are bent being preferably substantially parallel to the magnetic axis of the pole. These bent tip portions 16ª and 16ᵇ constitute means for preventing distortion of those portions of the spool and winding lying radially within the same and assist in holding the spool and its winding securely in position.

It will be apparent that these supporting projections may be disposed at any point along the sides of the spool 14, by cutting or slitting the end laminations 16 to the desired extent along lines coinciding with the radially inner side of the tip portions of the laminations and bending those portions of the laminations beyond the slit at any angle to the body portions of the laminations, in the general manner indicated in Fig. 3, but with the bent tips nearer the vertical median line of the lamination shown.

While sufficient support for the side portions of the spool 14 and its winding may, ordinarily, be secured through projections bent from a single lamination, the greatest strength of the laminations being utilized, due to the fact that the bent projections present edge portions to resist all strains on the spool and winding, it will be apparent that two or more of such laminations may be bent in the general manner described whenever additional support for the spool and winding is desired.

In the modification shown in Figs. 4 and 5, the field pole 31, made up of laminations secured together and shown as being unprovided with pole tips and being concave at its polar face, this type of pole being intended for use on the stationary member of a dynamo-electric machine, is provided with a winding 33 disposed on a spool 34. In order to secure proper support for the winding and spool, one or more end laminations 36 and 37 are provided with slits 38 along lines lying in the plane corresponding to the position occupied by the radially inner face of the spool 34, when the latter is in operative position on the pole, and the partially severed corner pieces of these end laminations are bent back at an angle away from the body portions of the laminations to form securing projections 36ª, 36ᵇ and 37ª, 37ᵇ, the projections being preferably bent along lines parallel to the axis of the pole lying radially of the machine, or, generally speaking, parallel to the magnetic axis of the pole. Those portions of the bent projections that extend beyond the general pole face of the pole structure may be removed in any suitable manner, as by filing, so that no parts will extend to any appreciable extent into the air gap when the pole is in operative position on the machine.

Due to the fact that there are no considerable strains tending to displace the winding on a stationary field pole, projections bent from one, or possibly two, of the end laminations of the pole are usually sufficient to securely support the winding and its spool in operative position, maximum securing effect being attained by reason of the fact that the bent projections present edge portions for resisting the displacement of the spool and winding; and the forces acting upon the bent projections are not in such direction as to have any noticeable effect in straightening out or unbending such projections.

It will be apparent that the securing means disclosed in Figs. 4 and 5 may be used with field poles, unprovided with pole tips and mounted on the rotating element of a machine, it being a matter of design as to how many laminations are required to be bent back to afford an abutment of sufficient strength to firmly secure the winding and spool therefor in operative position on the pole, these bent projections readily preventing distortion of any portion of the winding or spool, especially when the adjacent flange of the spool is of rigid construction or is provided with a strengthening plate for transmitting the holding effect of the bent projections evenly to all portions of the spool.

It should be understood that it is not desired that this invention, as claimed, be limited to the exact details of construction shown and described, for obvious modifications will occur to a person skilled in the art.

It is claimed and desired to secure by Letters Patent:

1. In a magnet structure, a core of magnetic material, a relatively thin plate disposed on a side of said core, a winding surrounding said core and plate, a portion of said plate being bent out of its own general plane and presenting an edge portion for holding said winding on said core.

2. In a dynamo-electric machine, a field pole having a laminated body portion, and a winding thereon, portions of end laminations of said pole being bent out of the planes of the body portions of the respective end laminations and presenting edge portions for the support of said winding on said pole.

3. In a dynamo-electric machine, a laminated field pole, and a winding surrounding the laminations of said pole, side portions of the end laminations of said pole adjacent the polar face of said pole being bent out of the general planes of said end laminations, and along lines approximately parallel to the magnetic axis of the pole to form a support for said winding.

4. In a dynamo-electric machine, a field pole, the body portion of which is made up of laminations, and a winding thereon, side portions of end laminations of said pole being bent at right angles along lines parallel to the magnetic axis of said pole to form abutments for said winding on said pole.

5. In a dynamo-electric machine, a field pole comprising a laminated body portion provided with integral pole tips adjacent the polar face of said pole and extending circumferentially of the machine and a winding on said pole, tip portions of end laminations of said pole being bent along lines substantially parallel to the magnetic axis of the pole to form a supporting seat for said winding on said pole.

6. In a dynamo-electric machine, a field pole having a laminated body portion provided with integral pole tips adjacent the polar face of said pole and extending circumferentially of the machine, and a winding on said pole, tip portions of the end laminations of said pole being bent at right angles to the body portions of said end laminations along lines approximately parallel to the magnetic axis of said pole to form a support for said winding.

In testimony whereof, the signature of the inventor is affixed hereto.

ARTHUR J. BROWN.

Copies of this patent may be obtained for five cents each, by addressing the "Commissioner of Patents, Washington, D. C."